United States Patent
Kihara et al.

(10) Patent No.: US 9,024,605 B2
(45) Date of Patent: May 5, 2015

(54) POWER SUPPLY DEVICE INCLUDING A SECOND DC POWER SUPPLY IN ITS LOAD CIRCUIT

(71) Applicant: Mitsubishi Electric Corporation, Chiyoda-ku, Tokyo (JP)

(72) Inventors: Nobuhiro Kihara, Chiyoda-ku (JP); Isao Yoneda, Chiyoda-ku (JP); Toru Daigo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 138 days.

(21) Appl. No.: 13/968,096

(22) Filed: Aug. 15, 2013

(65) Prior Publication Data

US 2014/0292294 A1    Oct. 2, 2014

(30) Foreign Application Priority Data

Apr. 2, 2013  (JP) .................................. 2013-076584

(51) Int. Cl.
*G05F 1/00* (2006.01)
*H02M 1/14* (2006.01)
*H02M 1/32* (2007.01)
*H02M 3/155* (2006.01)

(52) U.S. Cl.
CPC  *H02M 1/14* (2013.01); *H02M 1/32* (2013.01); *H02M 3/155* (2013.01)

(58) Field of Classification Search
CPC .......... H02M 1/14; H02M 1/32; H02M 3/155
USPC ......... 323/222–225, 259, 271–275, 282–285; 363/16, 126
See application file for complete search history.

(56) References Cited

U.S. PATENT DOCUMENTS 2,770,734 A * 11/1956 Reek ................................. 331/77
3,135,920 A * 6/1964 Herzog ....................... 455/192.1
3,148,332 A * 9/1964 Theriault ..................... 455/341

(Continued)

FOREIGN PATENT DOCUMENTS

JP    55-115311 A    9/1980
JP    02-179267 A    7/1990

(Continued)

OTHER PUBLICATIONS

Japanese Office Action, issued May 20, 2014 in Patent Application No. 2013-076584.

*Primary Examiner* — Timothy J Dole
*Assistant Examiner* — Yusef Ahmed
(74) *Attorney, Agent, or Firm* — Sughrue Mion, PLLC; Richard C. Turner

(57) ABSTRACT

The size of a reactor is reduced in a power supply device whose load circuit includes a second DC power supply. A power supply device includes: a chopper circuit CH connected between a first DC power supply E1 and load circuit L; and a filter circuit FI that includes a filter coil L2 and filter capacitor C and is interposed between the first DC power supply E1 and chopper circuit CH or between the second DC power supply E2 and chopper circuit CH; wherein the DC-current-inductance characteristic curve of the filter coil L2 and DC-current-inductance characteristic curve of the reactor L1 intersect each other, and the inductance value of the reactor L1 is made larger than that of the filter coil L2 in the region of current lower than a current value at the intersecting point.

5 Claims, 4 Drawing Sheets

(56) References Cited

U.S. PATENT DOCUMENTS

| | | | | |
|---|---|---|---|---|
| 3,158,027 A * | 11/1964 | Kibler | ............... | 340/870.17 |
| 3,260,953 A * | 7/1966 | Kaufman et al. | ............... | 330/61 A |
| 3,946,300 A * | 3/1976 | Landis | ............... | 363/141 |
| 3,950,673 A * | 4/1976 | Gries | ............... | 315/408 |
| 3,993,931 A * | 11/1976 | den Hollander | ............... | 315/408 |
| 5,027,263 A | 6/1991 | Harada et al. | | |
| 5,063,488 A | 11/1991 | Harada et al. | | |
| 6,038,157 A * | 3/2000 | Mortimer et al. | ............... | 363/136 |
| 6,304,065 B1 * | 10/2001 | Wittenbreder | ............... | 323/259 |
| 7,557,546 B2 * | 7/2009 | Uruno et al. | ............... | 323/259 |
| 8,130,524 B2 * | 3/2012 | Lee et al. | ............... | 363/132 |
| 8,427,120 B1 * | 4/2013 | Cilio | ............... | 323/266 |
| 2002/0089290 A1 * | 7/2002 | Ueda | ............... | 315/169.2 |
| 2004/0036451 A1 * | 2/2004 | Itoh et al. | ............... | 323/225 |
| 2006/0285366 A1 * | 12/2006 | Radecker et al. | ............... | 363/16 |
| 2009/0262557 A1 * | 10/2009 | Asuke et al. | ............... | 363/18 |
| 2011/0019448 A1 * | 1/2011 | Miyake et al. | ............... | 363/123 |
| 2011/0032737 A1 * | 2/2011 | Rincent et al. | ............... | 363/64 |
| 2011/0260706 A1 * | 10/2011 | Nishijima | ............... | 323/311 |
| 2013/0021007 A1 * | 1/2013 | Chiba | ............... | 323/265 |
| 2013/0214758 A1 * | 8/2013 | Kihara et al. | ............... | 323/311 |
| 2013/0223651 A1 * | 8/2013 | Hoyerby | ............... | 381/120 |
| 2014/0056041 A1 * | 2/2014 | Zhu et al. | ............... | 363/56.01 |
| 2014/0092652 A1 * | 4/2014 | Kihara et al. | ............... | 363/50 |
| 2014/0218987 A1 * | 8/2014 | Hu et al. | ............... | 363/126 |

FOREIGN PATENT DOCUMENTS

| | | |
|---|---|---|
| JP | 2008-112935 A | 5/2008 |
| JP | 2009-118552 A | 5/2009 |
| JP | 2012-075207 A | 4/2012 |

* cited by examiner

POWER SUPPLY DEVICE INCLUDING A SECOND DC POWER SUPPLY IN ITS LOAD CIRCUIT

BACKGROUND OF THE INVENTION

1. Field of the Invention

The present invention relates to a power supply device connected to a load circuit including a DC power supply.

2. Description of the Related Art

This type of conventional power supply device as disclosed in, for example, Patent document 1 includes: a first DC power supply; a chopper circuit made up of a chopper switching element Q1, synchronous-rectification switching element Q2 and reactor L1 connected to the connection point between the switching elements Q1 and Q2; an output smoothing capacitor Cout; and a drive circuit that controls turning on and off the chopper switching element Q1. The drive circuit outputs a drive signal in such a way as to turn on the switching element Q1 for a predetermined time T1 and turn off for a predetermined time T2 in an alternating manner, whereby input voltage from the first DC power supply is descended to a predetermined output voltage, and current is supplied to a load circuit connected in parallel to the output smoothing capacitor Cout.

Moreover, as shown in FIG. 8 of Patent document 2, for example, a filter circuit including a filter coil and filter capacitor is provided to prevent conducted noise made by a chopper circuit from flowing into a DC power supply or a load circuit.
Patent document 1: Japanese Laid-Open Patent Publication No. 2012-75207
Patent document 2: Japanese Laid-Open Patent Publication No. 2009-118552

In the foregoing conventional power supply devices, the reactor L1 is designed so as to obtain a predetermined inductance value when the rated current flows there. However, when the load circuit is configured including a second DC power supply, if the on-time T1 and off-time T2 are deviated from the values originally required, due to external disturbances such as load fluctuation of the load circuit, there would be a danger of an excessive current occurring.

In general, a reactor inherently has drooping characteristics in which its inductance value decreases when DC current flows therethrough; therefore once an excessive current flows, the current increasing rate goes up at an accelerated pace, which will likely lead to damage to the power supply device.

Therefore, a certain level of inductance value needs to be secured even in an excessive current flowing region, which has caused a problem in that the reactor will be increased in size.

SUMMARY OF THE INVENTION

The present invention has been made aiming at reducing the size of a reactor in a power supply device configured including a second DC power supply in its load circuit.

A power supply device according to the present invention comprises: a first DC power supply; a load circuit including a second DC power supply; a chopper circuit that includes at least one switching element and one flywheel semiconductor element and a reactor connected to the connection point between the switching element and flywheel semiconductor element and is connected between the first DC power supply and load circuit; and a filter circuit that includes a filter coil and filter capacitor and is connected between the first DC power supply and chopper circuit or between the second DC power supply and chopper circuit; wherein the DC-current-inductance characteristic curve of the filter coil and DC-current-inductance characteristic curve of the reactor intersect each other, and the inductance value of the reactor is made larger than that of the filter coil in the region of current lower than a current value at the intersecting point.

The present invention enables reduction in the reactor size in a power supply device whose load circuit includes a second DC power supply to be easily achieved, only by selecting the DC-current-inductance characteristics of the reactor of the chopper circuit and those of the filter coil of the filter circuit so as to establish a specified relation.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
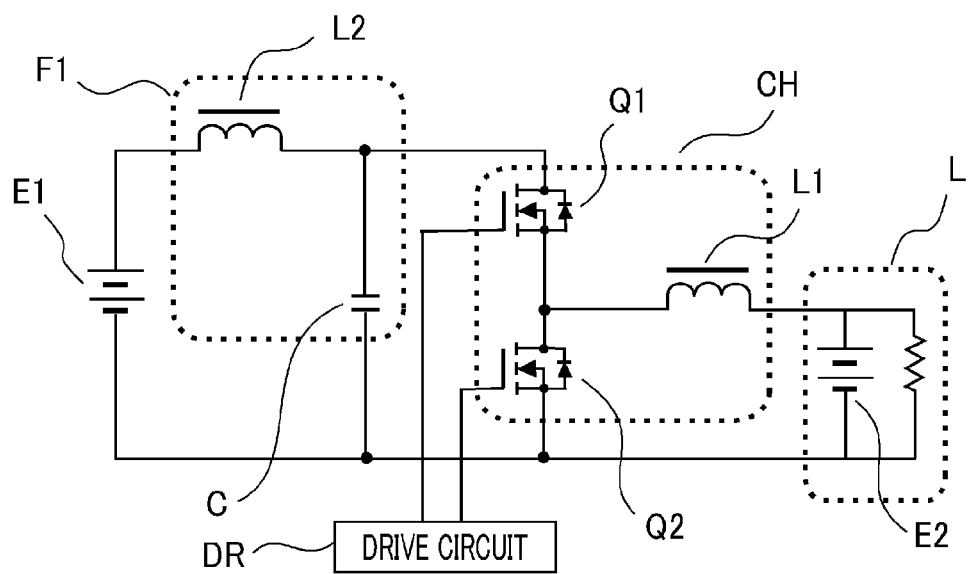
FIG. 1 is a circuit configuration diagram of a power supply device according to Embodiment 1 of the present invention.

FIG. 1 shows the configuration of a power supply device according to Embodiment 1 of the present invention.

The power supply device according to this Embodiment 1 comprises: a first DC power supply E1; a load circuit L including a second DC power supply E2; a chopper circuit CH including a chopper switching element Q1, synchronous-rectification switching element Q2 and reactor L1 connected to the connection point between the switching elements Q1 and Q2; a filter circuit FI that includes a filter coil L2 and filter capacitor C and is interposed between the first DC power supply E1 and chopper circuit CH; and a drive circuit DR that controls turning on and off the chopper switching element Q1; wherein the drive circuit DR outputs a drive signal to turn on the switching element Q1 for a predetermined time T1 and turn off for a predetermined time T2 in an alternating manner, whereby input voltage from the first DC power supply E1 is descended to a predetermined voltage, so as to supply current to the load circuit L.

In this power supply device, the reactor L1 serves to allow current to continue flowing when the chopper switching element Q1 turns on and off. Meanwhile, the filter coil L2 is provided to prevent conducted noise made by the chopper circuit CH from flowing into the DC power supply, and serves to remove noise components that the filter capacitor fails to remove.

In the normal operation, circuit constants are selected so that the inductance value of the reactor L1 becomes larger than that of the filter coil L2.

On the other hand, if the on-time T1 and off-time T2 deviate from the values originally required, due to external disturbances such as load fluctuation of the load circuit L, an excessive current is likely to occur between the first DC power supply E1 and second DC power supply E2.

At this moment, the filter coil L2 and reactor L1 connected in series between the first DC power supply E1 and second DC power supply E2 can suppress current increasing. However, a reactor generally has inherent drooping characteristics in which its inductance value decreases when DC current flows therethrough; therefore once the excessive current flows there, the current increasing rate goes up at an accelerated pace, which will likely lead to damage to the chopper circuit CH. Therefore, a certain level of inductance value needs to be secured even in a high current region.

The relation between the DC current and inductance depends on the number of turns of the coil and magnetic resistance (a value dependent on the cross-sectional area of its core, core material, an air gap in the magnetic circuit, etc.). Trying to secure the certain level of inductance by a single coil while maintaining a large inductance value at low current would lead to an increase in the coil size.

In Embodiment 1, the DC-current-inductance curve of the filter coil L2 and that of the reactor L1 intersect each other, and constants for L1 and L2 are selected so that the inductance value of the reactor L1 becomes larger than that of the filter coil L2 at the low current.

Figure 2A:
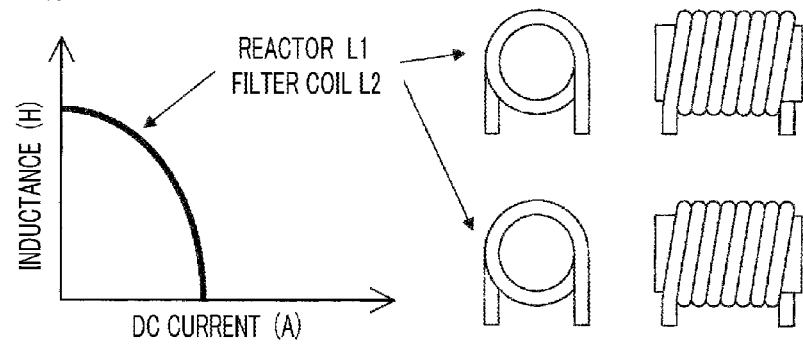
FIGS. 2A, 2B and 2C each are an explanatory view showing relations between the shapes of a filter coil L2 and reactor L1 and their DC-current-inductance characteristics according to Embodiment 1 of the invention.
Figure 2B:
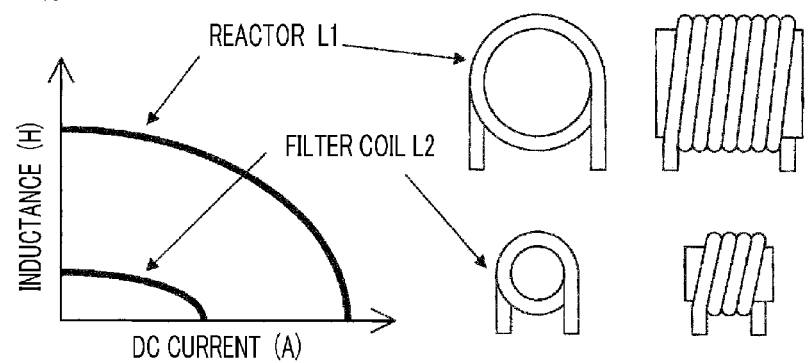
Figure 2C:
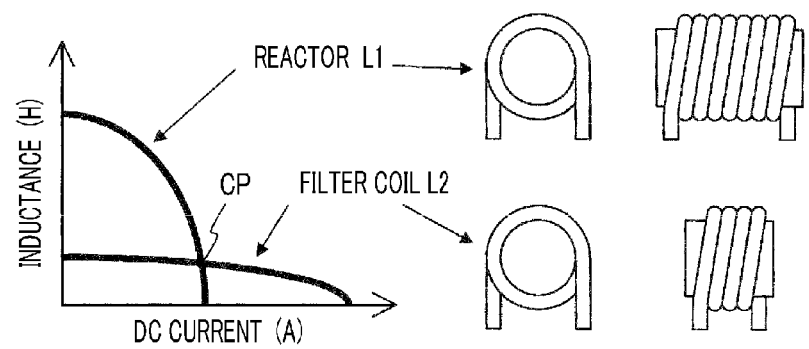

FIGS. 2A, 2B and 2C each are an explanatory view showing relations between the shapes of the filter coil L2 and reactor L1 and their DC-current-inductance characteristics. FIG. 2A represents a case in which the same coil is used for the reactor L1 and filter coil L2; FIG. 2B, another case in which the inductance is secured by the reactor L1 at high current; and FIG. 2C, still another case in which the inductance is secured by the filter coil L2 at the high current.

In the case of the combination in FIG. 2A, the inductance comes into an unsecured state at the high current.

In the case of the combination in FIG. 2B, the core sectional area of the reactor L1 is increased in order to secure the inductance at the high current (the core sectional area is increased twice as large as that of the configuration in FIG. 2A), and as to the filter coil L2, the core sectional area and the number of turns of the coil are decreased because the inductance value required for the filter coil is smaller than that of the reactor L1 (the core sectional area and the number of turns are decreased to one half of those of the configuration in FIG. 2A). As a result, the volume of the reactor L1 becomes twice and that of the filter coil L2 becomes one quarter compared to the configuration in FIG. 2A.

In the case of the combination in FIG. 2C, the reactor L1 has the same configuration as that in FIG. 2A, and as to the filter coil L2, the number of turns of the coil is decreased in order to secure the inductance of the coil at the high current (the number of turns is decreased to one half compared to the configuration in FIG. 2A). As a result, the volume of the reactor L1 remains intact and that of the filter coil L2 becomes one half compared to the configuration in FIG. 2A.

If the configurations in FIG. 2B and FIG. 2C are compared with each other, the configuration in FIG. 2C can be achieved with a volume of 67%.

That is to say, as shown in FIG. 2C, the DC-current-inductance curve of the filter coil L2 and that of the reactor L1 intersect each other at the intersecting point CP, and in addition, constants for L1 and L2 are selected in such a way that the inductance value of the reactor L1 becomes larger than that of the filter coil L2 in the region of current lower than a current value at this intersecting point CP, whereby the reactor L1 and filter coil L2 can be reduced in size, so that the power supply device can be miniaturized.

DC-current-inductance characteristics are shown in the table below as an example, in which one toroidal-shaped coil with a diameter of 33 mm and an axial length of 22 mm (a volume of 19 cubic centimeters) is used for the reactor L1, and two rod-shaped (open magnetic circuit) coils connected in series with a diameter of 15 mm and an axial length of 24 mm (a volume of 8.5 cubic centimeters) are used for the filter coil L2.

| CURRENT (A) | INDUCTANCE ($\mu$H) | |
| --- | --- | --- |
| | REACTOR L1 | FILTER COIL L2 |
| 0 | 7.7 | 3.6 |
| 50 | 4.5 | 3.6 |
| 100 | 3.2 | 3.6 |

As described above, the DC-current-inductance curve of the filter coil L2 and that of the reactor L1 intersect each other, and the inductance value of the reactor L1 is made larger than that of the filter coil L2 in the region of current lower than the current value at this intersecting point. By making the characteristics as described above, the filter coil can be reduced in size compared to the reactor.

Moreover, it is preferable the current value at the intersecting point is in the region of current higher than the rated current of the power supply device, and also in the region of current lower than an excessive current (a current that parts incorporated in the power supply device can withstand).

As described above, the power supply device according to Embodiment 1 of the present invention comprises: the chopper circuit CH connected between the first DC power supply E1 and load circuit L; and the filter circuit FI including the filter coil L2 and filter capacitor C, connected between the first DC power supply E1 and chopper circuit CH; wherein the DC-current-inductance curve of the filter coil L2 and that of the reactor L1 intersect each other, and the inductance value of the reactor L1 is made larger than that of the filter coil L2 in the region of current lower than the current value at this intersecting point, whereby the reactor can be easily reduced in size in the power supply device whose load circuit L includes the second DC power supply E2.

Embodiment 2

A power supply device according to Embodiment 2 is configured the same as that of Embodiment 1; however, the core of the filter coil L2 is made of a material that has large loss due to variation in magnetic flux but has high magnetic flux density compared to the core material of the reactor L1. An Fe-based material and ferrite-based material are selected for the cores of the filter coil L2 and reactor L1, respectively, in this Embodiment.

Figure 3:
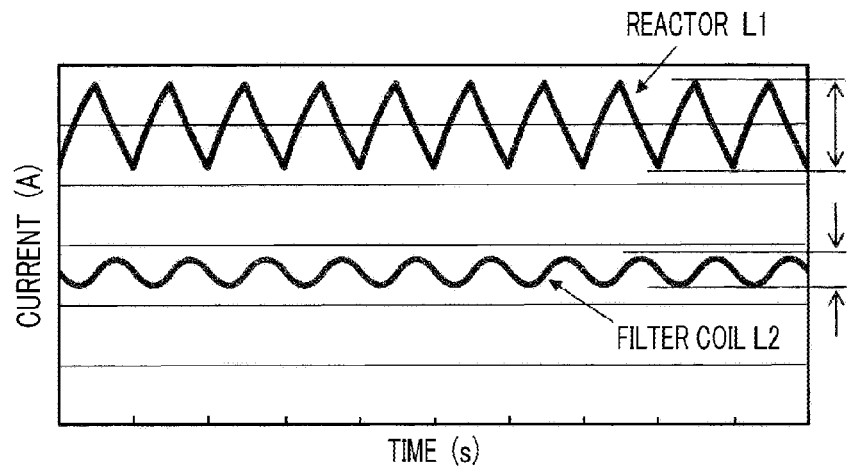
FIG. 3 is a waveform view of current flowing through a filter coil L2 and reactor L1 according to Embodiment 2 of the invention.

FIG. 3 shows waveforms of current flowing through the reactor L1 and filter coil L2 of the power supply device according to Embodiment 2. As shown in FIG. 3, each waveform demonstrates a DC current with an AC current superimposed thereon, and the amplitude of the ripple current through the reactor L1 is the larger of the two.

The amplitude of the ripple current causes variation in magnetic flux in the cores, which consequently causes loss (hysteresis loss and eddy current loss) in members constituting coils, particularly cores that are paths for the magnetic flux. Therefore, core loss caused in the filter coil L2 with the smaller amplitude of the ripple current is smaller than that caused in the reactor L1.

Figure 4:
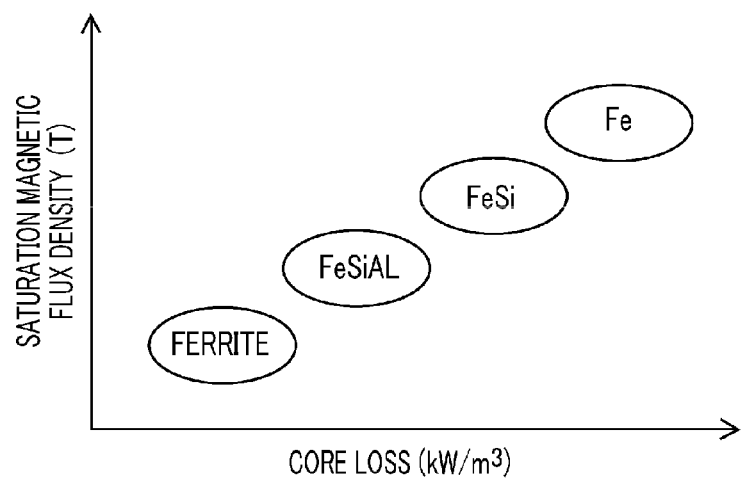
FIG. 4 is an explanatory view showing a common example of relations between loss due to magnetic flux variation and saturation magnetic flux density for different core materials according to Embodiment 2 of the invention.

Moreover, FIG. 4 shows a common example of relations between the loss due to magnetic flux variation and the saturation magnetic flux density for different core materials. Here, the saturation magnetic flux density tends to be lower as the core loss due to magnetic flux variation becomes less depending on the core materials. Conversely, a material with high saturation magnetic flux density can be selected as long as the core loss due to magnetic flux variation is tolerable. By selecting a material with high saturation magnetic flux density, the sectional area of a core can be reduced while maintaining its DC-current-inductance characteristics, so that a coil can be reduced in size.

As shown in FIG. 3, the amplitude of the ripple current flowing through the filter coil L2 is smaller than that of the ripple current flowing through the reactor L1, and the core loss due to magnetic flux variation is tolerable. Therefore, by selecting the material with high saturation magnetic flux density (Fe-based material in this Embodiment), the core sectional area can be reduced while maintaining the DC-current-inductance characteristics, so that the coil can be reduced in size.

Embodiment 3

The configuration of a power supply device according to Embodiment 3 is the same as that of Embodiment 1; however, closed-magnetic-circuit-type cores are used for both the reactor L1 and filter coil L2. Furthermore, the air gap of the core used for the reactor L1 is made wider than that of the core used for the filter coil L2.

Figure 5:
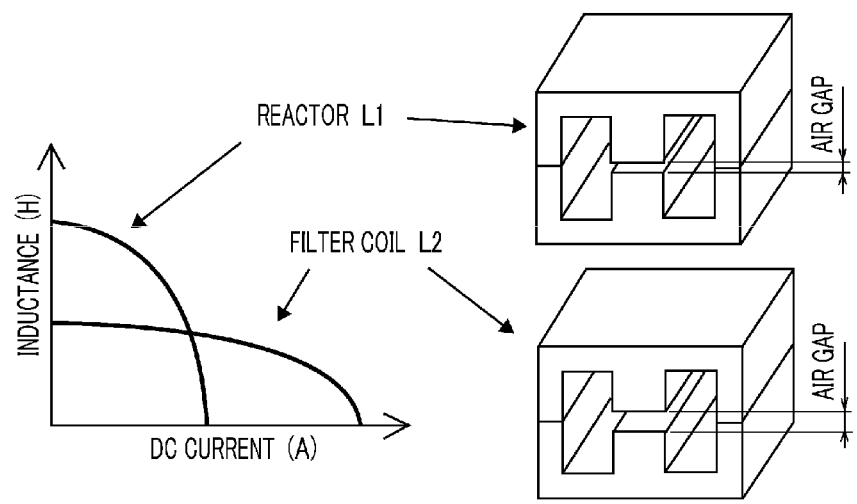
FIG. 5 is an explanatory view showing relations between the shapes of a filter coil L2 and reactor L1 and their DC-current-inductance characteristics according to Embodiment 3 of the invention.

FIG. 5 shows the shapes of the cores and their DC-current-inductance characteristics in this Embodiment. E-shaped closed-magnetic-circuit-type cores are used for both the reactor L1 and filter coil L2; however, the air gap of the core used for the filter coil L2 is made wider to increase its magnetic resistance, whereby the filter coil is provided with characteristics in which its inductance value is secured even if high current flows therethrough, although the inductance value itself decreases.

In the configuration of Embodiment 3, by using the closed-magnetic-circuit-type cores, noise made by magnetic flux variation due to ripple components of the current flowing through the reactor L1 and filter coil L2 can be prevented from leaking outside, and in addition, the inductance of the reactor L1 can be secured at the high current without increasing its size.

Moreover, by making only the core used for the filter coil L2 an open-magnetic-circuit type in the configuration of Embodiment 3, the magnetic resistance thereof can be increased, so the filter coil L2 can be reduced in size, while securing the inductance at the high current even if the core sectional area is reduced. If an open-magnetic-circuit-type core is used, the amount of noise leaking outside made by the magnetic flux variation due to the ripple components of the current flowing through the coil will increase; however, waveforms of the current flowing through the reactor L1 and filter coil L2 each become a DC current with an AC current superimposed thereon, the same as those shown in FIG. 3, the amplitude of the ripple current flowing through the reactor coil L1 is larger than that of the ripple current through the filter coil L2, and the amount of noise leaking outside made by the magnetic flux variation falls within an allowable range of practical use, without causing any problem.

Embodiment 4

Power supply devices according to the foregoing embodiments are configured including a synchronous-rectification-type descending chopper circuit. However, the power supply devices are not limited to this, but can be configured using any other types of chopper, such as a diode-rectification type, ascending type, and ascending and descending type, thereby also producing the same effect.

Figure 6:
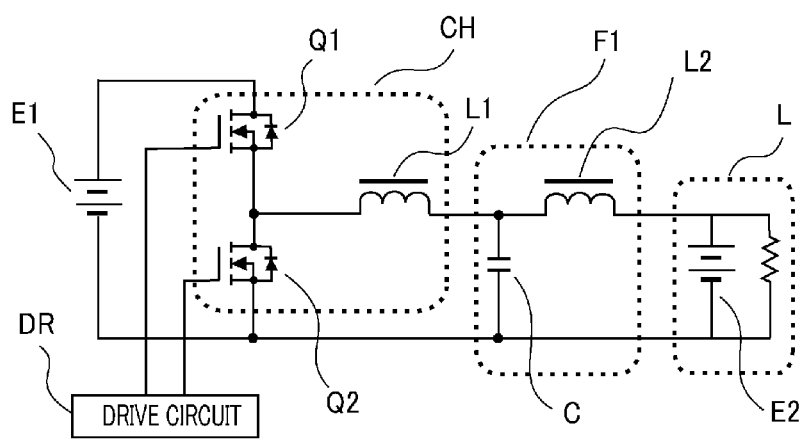
FIG. 6 is a circuit configuration diagram of a power supply device according to Embodiment 4 of the invention.

Moreover, the filter coil L2 is interposed between the first DC power supply E1 and chopper circuit CH; however, the same effect can be produced even if the filter coil L2 is interposed between the second DC power supply E2 and chopper circuit CH as shown in FIG. 6.

Additionally, the embodiments according to this invention can be freely combined with each other, suitably modified or deleted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A power supply device, comprising:
   a first DC power supply;
   a load circuit including a second DC power supply;
   a chopper circuit that includes at least one switching element and one flywheel semiconductor element and a reactor connected to a connection point between the switching element and the flywheel semiconductor element and is connected between the first DC power supply and the load circuit; and
   a filter circuit that includes a filter coil and a filter capacitor and is connected between the first DC power supply and the chopper circuit or between the second DC power supply and the chopper circuit; wherein
   a DC-current-inductance characteristic curve of the filter coil and a DC-current-inductance characteristic curve of the reactor intersect each other, and a inductance value of the reactor is made larger than that of the filter coil in a region of current lower than a current value at the intersecting point.

2. A power supply device according to claim 1, wherein a core material used for the filter coil has saturation magnetic flux density higher than that of a core material used for the reactor.

3. A power supply device according to claim 2, wherein the core material used for the filter coil is an Fe-based material and the core material used for the reactor is a ferrite-based material.

4. A power supply device according to claim 1, wherein cores used for the filter coil and the reactor are closed-magnetic-circuit-shaped, and an air gap provided on a core used for the filter coil is wider than that provided on a core used for the reactor.

5. A power supply device according to claim 1, wherein a core used for the filter coil is open-magnetic-circuit-shaped and a core used for the reactor is closed-magnetic-circuit-shaped.

* * * * *